US005752379A

United States Patent [19]

Schafer et al.

[11] Patent Number: 5,752,379

[45] Date of Patent: May 19, 1998

[54] NON-RECOVERABLE SURGE AND BLOWOUT DETECTION IN GAS TURBINE ENGINES

[75] Inventors: Bradley C. Schafer, Vernon; John C. Szillat, Rockville, both of Conn.

[73] Assignee: United Technologies Corporation, Hartford, Conn.

[21] Appl. No.: 506,758

[22] Filed: Jul. 26, 1995

Related U.S. Application Data

[63] Continuation of Ser. No. 172,344, Dec. 23, 1993, abandoned.

[51] Int. Cl.$^6$ .......... F02C 9/00

[52] U.S. Cl. .......... 60/39.24; 60/39.281; 60/39.29

[58] Field of Search .......... 60/39.091, 39.141, 60/39.24, 39.281, 39.29; 364/431.02, 431.01; 415/26, 27

[56] References Cited

U.S. PATENT DOCUMENTS

| | | | |
|---|---|---|---|
| Re. 34,388 | 9/1993 | Dubin . | |
| 3,852,958 | 12/1974 | Adams et al. | 60/39.281 |
| 3,867,717 | 2/1975 | Moehring . | |
| 4,060,980 | 12/1977 | Elsaesser et al. | 60/39.181 |
| 4,083,235 | 4/1978 | Gallant | 364/431.02 |
| 4,117,668 | 10/1978 | Elsaesser et al. | 60/39.281 |
| 4,118,926 | 10/1978 | Curvino et al. | 60/39.281 |
| 4,137,710 | 2/1979 | Preti et al. | 60/39.281 |
| 4,581,888 | 4/1986 | Schmitzer et al. | 60/39.29 |
| 4,594,051 | 6/1986 | Gaston | 364/431.02 |
| 4,603,546 | 8/1986 | Collins | 60/39.29 |
| 5,012,637 | 5/1991 | Dubin et al. | 60/39.24 |
| 5,269,136 | 12/1993 | Khalid . | |
| 5,375,412 | 12/1994 | Khalid et al. | 60/39.29 |

FOREIGN PATENT DOCUMENTS

| | | |
|---|---|---|
| 0 418 189 | 3/1991 | European Pat. Off. . |

*Primary Examiner*—Timothy Thorpe
*Assistant Examiner*—Ted Kim
*Attorney, Agent, or Firm*—McCormick, Paulding & Huber

[57] ABSTRACT

Indications of non-recoverable compressor surge and blowout are provided by sensing compressor pressure, temperature and speed and comparing exhaust temperature with stored values and successive values depending upon instantaneous compressor speed and its derivative. Blowout indication is provided in timed intervals that are reset if surge indications are present.

6 Claims, 3 Drawing Sheets

NON-RECOVERABLE SURGE AND BLOWOUT DETECTION IN GAS TURBINE ENGINES

This application is a continuation of application Ser. No. 08/172,344, filed Dec. 23, 1993, now abandoned.

TECHNICAL FIELD

This invention relates to gas turbine engines, in particular, techniques to detect and differentiate between non-recoverable surge and burner blowout.

BACKGROUND OF THE INVENTION

Compressor non-recoverable surge is a condition in which compressor flow capacity and efficiency have significantly degraded, causing a significant loss in thrust and elevated turbine temperatures, which, if left unchecked, will cause extensive damage. Burner blowout also causes significant loss in thrust, but can be corrected automatically by an electronic engine control system. When a pilot confronts compressor surge at engine idle speeds, the engine must be shut down to avoid damage, but the pilot may not know if the loss of speed is due to surge or other compressor aerodynamic losses. In many respects, a surge condition may be confused with a compressor blowout, which also produces a significant reduction in thrust and compressor speed, but is far less serious because core flow does not reverse. Confronted with a blowout, the pilot can initiate a burner re-light sequence.

DISCLOSURE OF THE INVENTION

An object of the present invention is to provide a system that can be incorporated into a full authority digital electronic engine control (FADEC) that alerts the pilot to non-recoverable surge conditions and blowout conditions.

According to the present invention, a surge condition is sensed and prompts a test for changes in exhaust temperature elevation and a test to determine if N2 is less than idle, producing a non-recoverable surge indication, if both tests are affirmative.

According to the invention, tests are performed on N2 to determine if the engine speed is below idle (if N2 is less than a reference value), and, if it continues to decelerate (if the first derivative of N2 or N2) is less that a reference value. If both tests are satisfied or a surge is detected, exhaust gas temperature (T49) is sensed and compared to subsequent values of exhaust temperature, producing an error. If this error shows that the exhaust gas temperature increase is greater than a reference value or if exhaust gas temperature exceeds its redline value (maximum value), a signal indicating non-recoverable surge will be produced, if N2 is less than idle at the same time.

According to the invention, the signal indicating a non-recoverable surge is cleared if N2 reaches idle.

According to the invention, a signal indicating a blowout is produced if the engine is below idle (if N2 is less than a reference value), if it continues to decelerate (N2 is less than a reference value), and if neither the exhaust temperature increase nor exhaust gas temperature exceeds their respective reference values, and if all these conditions remain present for a period of time set by a timer.

According to the invention, the signal indicating burner blowout is cleared when N2 reaches idle or if a non-recoverable surge is subsequently detected.

A feature of the present invention is that the use of a time delay for burner blowout indication prevents a surge that occurs at or just above idle and become non-recoverable from being initially declared a burner blowout.

Another feature of the present invention is that the use of N2 as a condition for checking for an increase in exhaust gas temperature prevents a re-light following a burner blowout from being declared a non-recoverable surge.

The invention provides a reliable technique that is easily incorporated in existing digital engine controls receiving, as most do, information on N2, PB and exhaust temperature. Other objects, benefits and features of the invention will be apparent to one skilled in the art from the drawings and the following discussion.

DETAILED DESCRIPTION OF THE INVENTION

Figure 1:
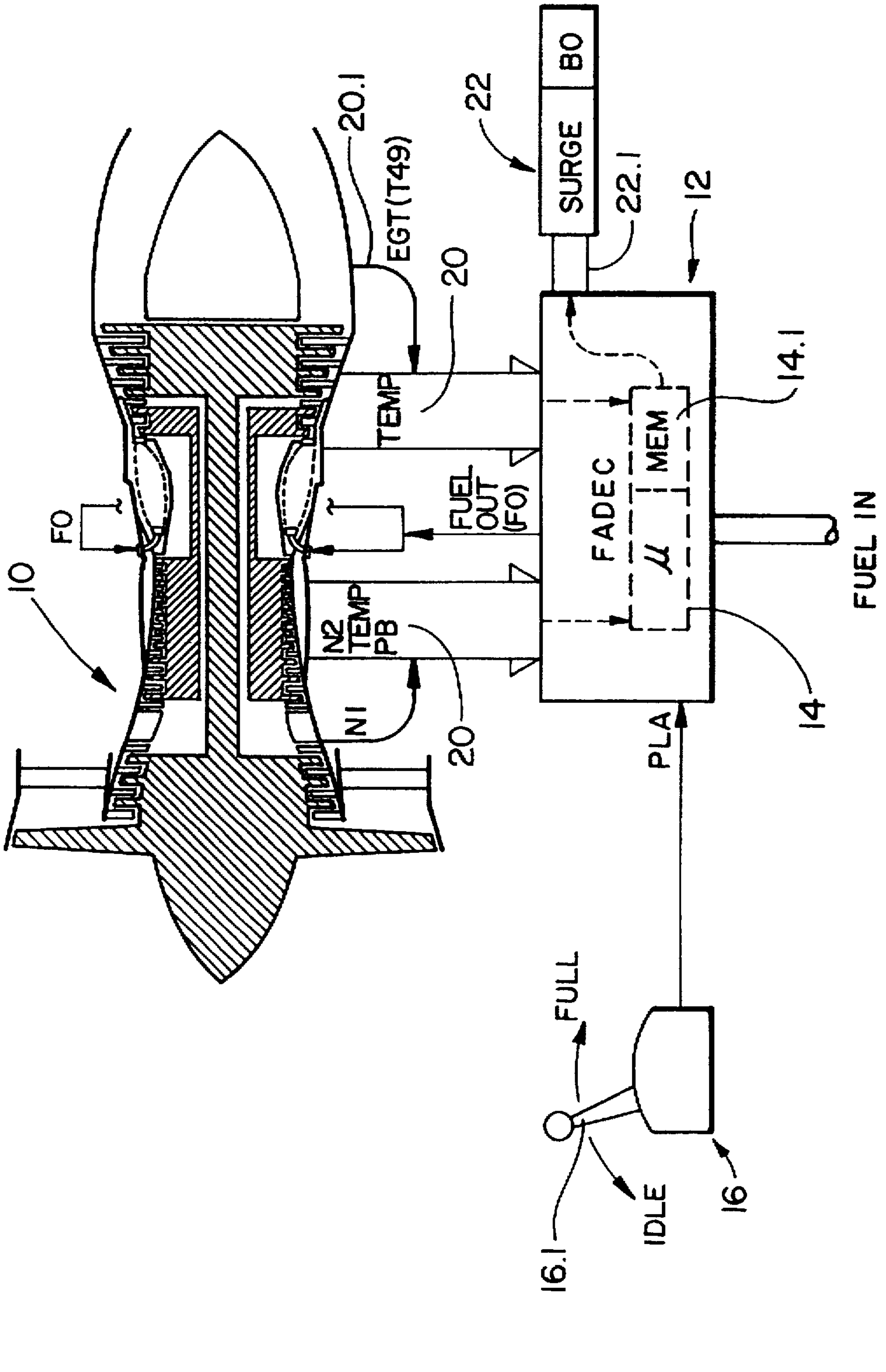
FIG. 1 is a simplified block diagram showing a high bypass aircraft gas turbine engine with a FADEC that may be programmed according to the present invention.

Referring to FIG. 1, a high bypass aircraft gas turbine engine 10 is connected to a fuel control 12 that includes a FADEC (full authority digital engine control) employing a microprocessor (μ) 14 or signal processor. All the components of the signal processor, such as clocks, registers and input/output ports, have not been shown. Those components and their use with a signal processor are well known. A memory unit MEM 14.1 is shown, as the location for the program sequences employed by the fuel control 12 to regulate fuel to the engine. The fuel control primarily responds to power requests manifested by the position PLA produced from a power lever control 16 that contains a power lever 16.1. The fuel control 12 receives engine operating information over data lines 20, such as engine speed N2, temperature TEMP, compressor pressure PB and exhaust gas temperature EGT. The control 12 also controls displays 22, which indicates a non-recoverable surge and compressor blowout using the signal processing sequences described in this application, in particular concerning the flow chart shown in FIG. 2A–2B.

The signal processor 14 operates at a very high computation rate, typically many millions of cycles per second, in the process executing many routines to control fuel flow and even other engine function. With the sequences shown in FIG. 2A–2B, the routine is executed/run during these cycles following conventional programming. In will be obvious to a programmer, of course, that there may be ways to collect and process data following the sequences in FIG. 2A–2B other than the precise arrangement of the sequences shown.

Figures 2A, 2B:
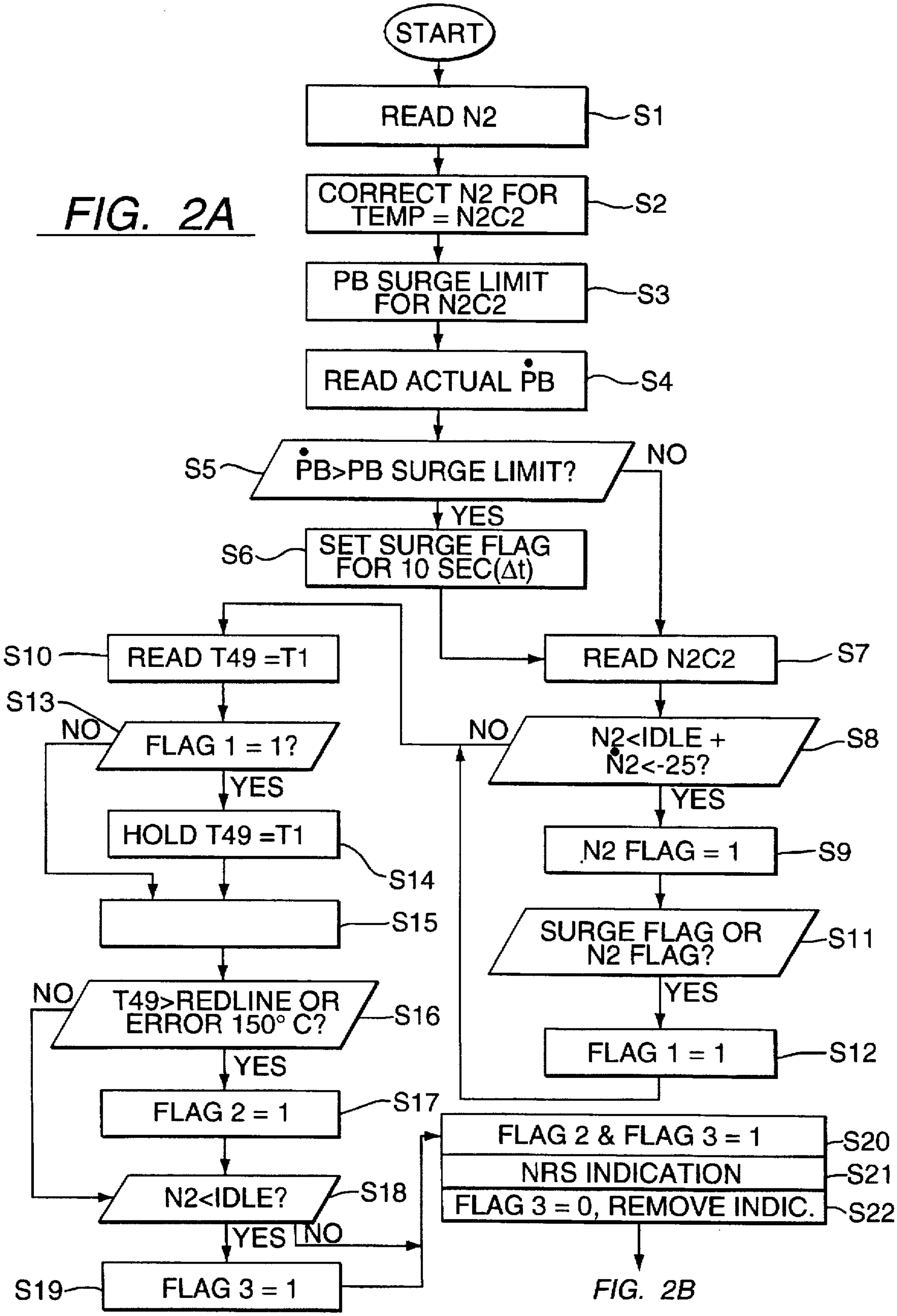
FIG. 2A–2B is a flow chart showing signal processing steps that may be implemented with a signal processor in the FADEC according to the present invention.
Figure 2B:
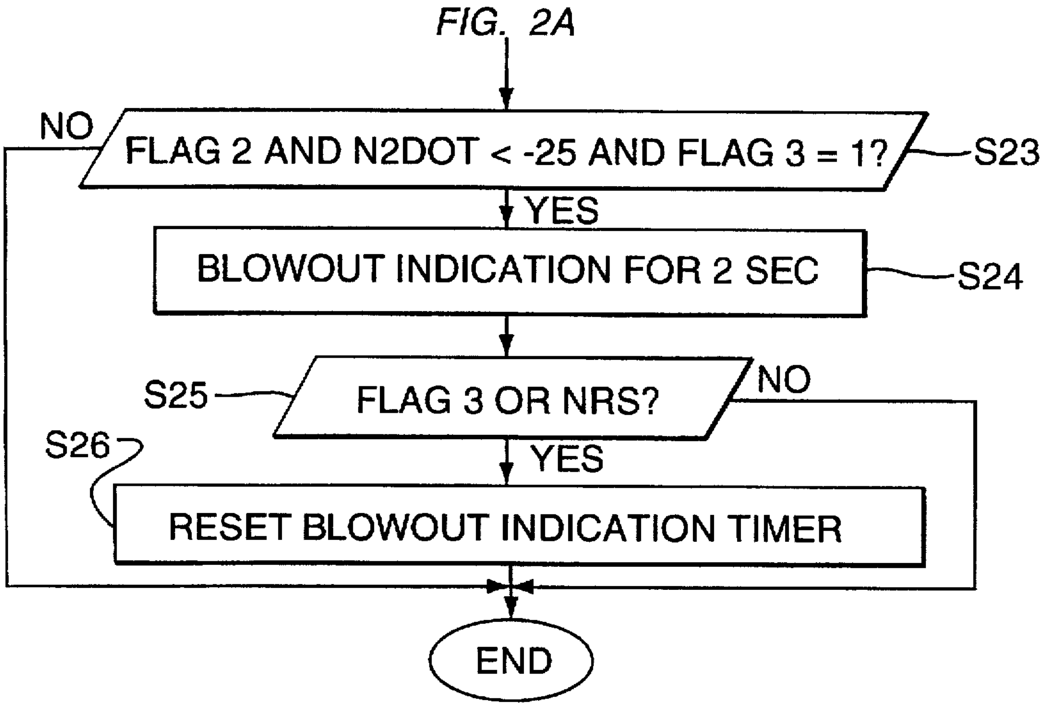

In FIG. 2A–2B, the value of N2 is read from the engine at step S1 and is corrected for temperature (conventional practice) at step S2, producing value N2C2. Step S3 involves computing a surge limit for $\dot{PB}$ (the first derivative PB) for N2C2, and the actual value for $\dot{PB}$ is read from the engine at step S4. A test is carried out at step S5 that determines if $\dot{PB}$ decreases at a rate exceeding the surge limit (computed in step S3). Step S6 sets a surge flag in memory if the test in step S5 produces an affirmative answer. At step S7, the value of N2C2 is again read, a step also reached by a negative answer to test made at step S6, but without setting the surge flag. The next step is step S8, where a test is made of whether N2 is less than idle speed and $\dot{N}2$ is less than a value, e.g., −25 RPM, meaning that N2 is decreasing faster than that rate. If the result at step S8, is positive, another flag, the N2 flag, is set in step S9. A negative answer at step S8, moves the process directly to step S10. At step S10, another engine parameter or operating characteristic is read: either the temperature at location 49 (using conventional gas turbine location reference numbers) or the EGT, exhaust gas temperature, a signal on the line 20.1 in FIG. 1. This value is stored as T1, as it may be used in subsequent test of EGT at a second interval. Step S9 moves to step S11, where a determination is made if the surge flag or the N2 flag has been set. A positive answer sets flag1 in step S12, from which the sequence goes to step S10. Step S13, produces a positive answer is flag 1 has been set, causing step S14 to hold the value of T1. At step S15, an error value is produced manifesting the difference between T1 and latest value of T49, obtained during the next run through the routine, e.g., a few microseconds later. A longer delay may be incorporated. The purpose is to compare T49 twice if flag 1 has been set. If flag1 has not been set, step S14 is bypassed, effectively meaning that the error will be zero. At step S16, a positive answer means that T49 is greater than the redline temperature for the engine or the error is greater than some value, e.g., 50° C. If flag 1 has not been set, only the first part of the test will apply. Step S17 sets another flag, flag 2, if step S16 produces a positive answer. Step S18 is reached from step S17 and by a negative answer at step S16, and determines if N2 is below idle speed. If N2 is below idle, producing an affirmative answer in step 18, another flag, flag 3, is set in step S19, from which the sequence moves to step S20, also reached by a negative answer at step S18. At step S20, the value 1 means that flag 2 and flag 3 are set. This causes an NRS (non-recoverable surge) signal to be produced over line 22.1 in step S21, activating the surge indicator in display 22. Step S22, removes the NRS signal when flag 3 is not set (value equals zero). Step S23 tests for a zero value for flag 2 (FLAG "not"), that is, the flag 2 is not present, $\dot{N}2$is less that −25 and flag 3 is set. The positive answer at step S23 causes a blowout signal to be sent to the display 22, at step S24, for a preset time, e.g., 2 seconds. From step S24, the process moves to step S25, where a test is made for the absence or zero value of flag 3 (FLAG 3 "not") or the presence of the NRS signal. A positive answer to the test at step S25, resets the blowout timer used in step S24. Then the process ends, a terminus also reached by negative answers at steps S23 and step S25. This prevents a surge that takes place at just above idle speed from being declared a blowout initially and then a non-recoverable surge. Similarly, the blow indication on display 22 is cleared when N2 is above idle or the surge flag is set.

With the benefit of the foregoing explanation of the invention, one skilled in the art may find it possible to make modifications to the invention, in whole or in part, in addition any described or suggested previously, without departing from the true scope and spirit of the invention.

We claim:

1. A gas turbine engine comprising a fuel control having signal processing means responsive to signals indicating engine operating conditions, characterized in that:

the signal processing means comprises means for providing a first signal indicating a surge condition; for providing, in response to the first signal, a second signal indicating elevated exhaust temperature; for providing a third signal in response to both the second signal and a fourth signal indicating compressor speed less than idle; for providing an indication of non-recoverable surge in response to the third signal: and for providing the second signal in response to an exhaust temperature higher than redline or a difference in exhaust temperature, at two successive times, that is greater than a stored value.

2. The gas turbine engine described in claim 1, further characterized in that:

the signal processing means comprises means for providing the first signal in response to a fifth signal indicating that compressor speed is less than idle and a sixth signal indicating that the derivative of compressor speed is less than a negative value; for providing a seventh signal indicating the absence of the second signal; for providing an eighth signal in response to the sixth signal and the seventh signal; and for providing an indication of a blowout in response to the eighth signal.

3. The gas turbine engine described in claim 2, further characterized in that:

the signal processing means comprises means for providing the eighth signal only for a time interval that is reset when the first signal is provided and compressor speed is above idle.

4. The gas turbine engine described in claim 3, further characterized in that:

the signal processing means comprises means for holding the third signal until compressor speed is above idle.

5. The gas turbine engine described in claim 3, further characterized in that:

the signal processing means comprises means for holding the third signal until compressor speed is above idle.

6. The gas turbine engine described in claim 1, further characterized in that:

the signal processing means comprises means for holding the third signal until compressor speed is above idle.

* * * * *